(12) United States Patent
Nakatate et al.

(10) Patent No.: US 7,221,834 B2
(45) Date of Patent: May 22, 2007

(54) IMAGE FIBER

(75) Inventors: Kenichi Nakatate, Sakura (JP); Keiji Kaneda, Sakura (JP); Takashi Tsumanuma, Sakura (JP)

(73) Assignee: Fujikura Ltd., Tokyo (JP)

( * ) Notice: Subject to any disclaimer, the term of this patent is extended or adjusted under 35 U.S.C. 154(b) by 95 days.

(21) Appl. No.: 10/648,275

(22) Filed: Aug. 27, 2003

(65) Prior Publication Data

US 2004/0042745 A1    Mar. 4, 2004

(30) Foreign Application Priority Data

Aug. 28, 2002  (JP)  ............................. 2002-249139

(51) Int. Cl.
*G02B 6/06* (2006.01)
(52) U.S. Cl. ...................... 385/116; 385/117
(58) Field of Classification Search ........ 385/100–108, 385/115–121, 123–128
See application file for complete search history.

(56) References Cited

U.S. PATENT DOCUMENTS

| 3,050,907 | A |  | 8/1962 | Hicks, Jr., et al. |
| 5,210,814 | A |  | 5/1993 | McNally |
| 5,751,879 | A | * | 5/1998 | Graham et al. ............. 385/103 |
| 6,148,131 | A | * | 11/2000 | Geertman .................... 385/123 |

FOREIGN PATENT DOCUMENTS

| DE | 196 49 045 A | 5/1998 |
| EP | 0 302 593 A | 2/1989 |
| JP | 61-252505 A | 11/1986 |
| JP | 62-142017 U | 9/1987 |
| JP | 2-120703 A | 5/1990 |
| JP | 3-81717 A | 4/1991 |
| JP | 03-171003 A | 7/1991 |
| JP | 11-256444 A | 7/1991 |
| JP | 4-42832 A | 2/1992 |
| JP | 6-279043 A | 10/1994 |
| JP | 2000-185931 A | 7/2000 |
| JP | 2001-208923 A | 8/2001 |

* cited by examiner

*Primary Examiner*—Kevin S. Wood
(74) *Attorney, Agent, or Firm*—Sughrue Mion, PLLC

(57) ABSTRACT

An image fiber includes an image fiber body having a twisted portion which is formed by heating, softening, and twisting a portion of the image fiber body. The rate of twist in the twisted portion is made to be constant. Moreover, the rate of twist may preferably be set in a range from 1°/mm to 4000°/mm. In addition, the rate of twist at the beginning portion of the twisted portion and the rate of twist at the end portion of the twisted portion may preferably be set in a range from 3°/mm to 400°/mm. The twisted portion may be provided with a protective element.

14 Claims, 6 Drawing Sheets

IMAGE FIBER

BACKGROUND OF THE INVENTION

Priority is claimed under 35 U.S.C. § 119 to Japanese Patent application No. 2002-249139 filed Aug. 28, 2002, which is incorporated herein by reference.

FIELD OF THE INVENTION

The present invention relates to an image fiber in which a twisted portion is provided in order to rotate the orientation of a transmitted image, or to improve the quality of a transmitted image.

BACKGROUND ART

Image fibers, to which a twisting process is applied, are known in the art. One of the purposes of applying such a twisting process is to rotate the orientation of a transmitted image at the object side of an image fiber with respect to that at the observer's side thereof. Another purpose is to improve the quality of a transmitted image such as contrast, etc., as disclosed, for example, in Japanese Unexamined Patent Application, First Publication No. 2000-185931. Contrast in a transmitted image is improved because undesired light, which leaks from a core and passes through a cladding, is reduced by applying an appropriate amount of twisting.

An image fiber twisting process includes removing a portion of a protective layer extending in the longitudinal direction of the image fiber to expose a body of the image fiber, softening the exposed portion by heating using a heat source such as an oxyhydrogen flame burner, twisting the image fiber about the center axis thereof, and cooling the image fiber for plastic fixation to obtain a twisted portion.

When the twisted portion is formed through the twisting process at an excessively large rate of twist, i.e., when the degree of twisting is excessive, deformation such as bending, elongation, etc., of cores that form pixels tend to become too great, and problems may be encountered in that defects such as dark spots are included in the transmitted image because light cannot pass through the cores. Another defect is that contrast in the transmitted image is reduced because light leaking from some cores affects adjacent cores.

In particular, the above-mentioned defects tend to be significant in the cores disposed near the periphery of the image fiber because deformation due to twisting is greater in the cores near the periphery than in the cores disposed around the center of the image fiber. The above-mentioned defects may occur where the degree of twisting is locally significant in the twisted portion.

SUMMARY OF THE INVENTION

In view of the above problems, an object of the present invention is to provide an image fiber in which a twisted portion is provided so that a transmitted image is rotated without degrading the quality of the transmitted image.

In order to achieve the object, the present invention provides an image fiber including an image fiber body having a twisted portion which is formed by heating, softening, and twisting a portion of the image fiber body, wherein the rate of twist in the twisted portion is constant.

In the above image fiber, the rate of twist may preferably be set in a range from 1°/mm to 4000°/mm.

In the above image fiber, the rate of twist at the beginning portion of the twisted portion and the rate of twist at the end portion of the twisted portion may preferably be set in a range from 3°/mm to 400°/mm.

In the above image fiber, the twisted portion may be provided with a protective element.

In the above image fiber, the image fiber body includes cores, and the rate of twist in the twisted portion is set in such a manner that the elongated lengths of the cores due to twisting do not exceed four times the original lengths thereof.

DETAILED DESCRIPTION OF THE INVENTION

The present invention will be explained below in detail.

Figure 1:
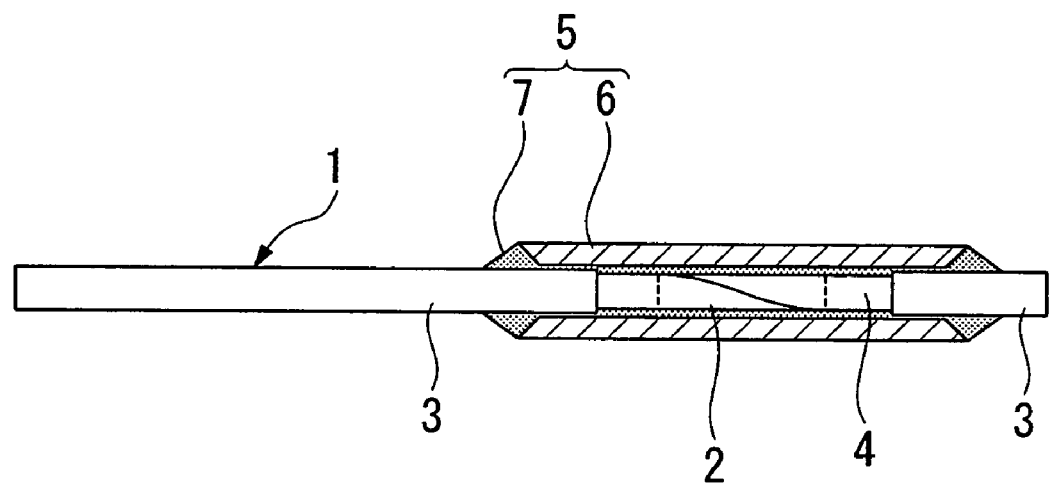
FIG. 1 is a schematic cross-sectional view showing an embodiment of an image fiber according to the present invention.

FIG. 1 shows an example of an image fiber, and reference numeral 1 indicates an image fiber. A twisted portion 2 is formed in the image fiber 1 along the longitudinal direction thereof.

The twisted portion 2 is formed by a process that includes: partially removing a protective layer 3 of the image fiber 1 to expose a portion of an image fiber body 4; heating the exposed portion of the image fiber body 4, except for a margin of a few millimeters from each end thereof, i.e., the middle portion of the exposed portion, using a heat source such as an oxyhydrogen flame burner to soften the image fiber body 4; twisting the image fiber body 4 in such a manner that an end of the image fiber 1 is fixed and the other end thereof is rotated about the center axis thereof, or both ends of the image fiber 1 are rotated about the center axis thereof in directions opposite to each other and cooling the image fiber body 4. During the above process, the image fiber 1 must be carefully held in order to prevent bending or axial offset of the image fiber 1 due to sagging of the heated portion of the image fiber body 4.

Figure 2:
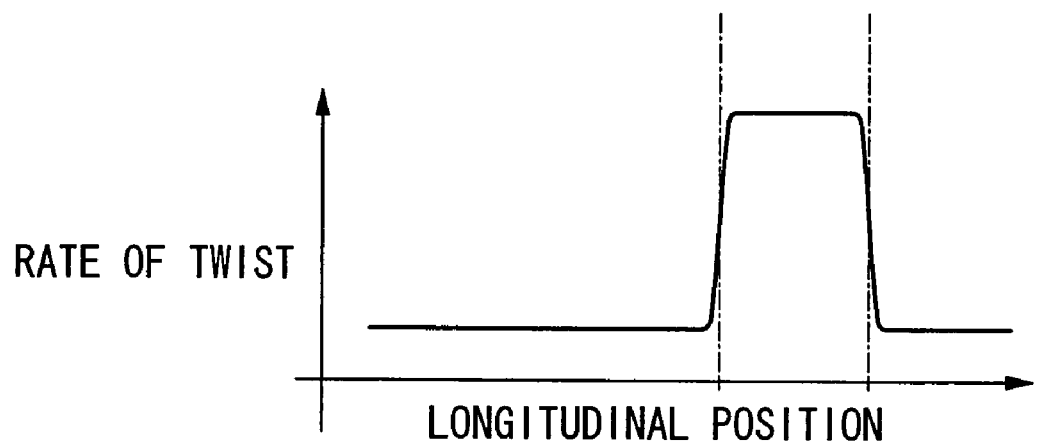
FIG. 2 is a diagram showing change in the rate of twist in the image fiber according to the present invention.
Figure 3:
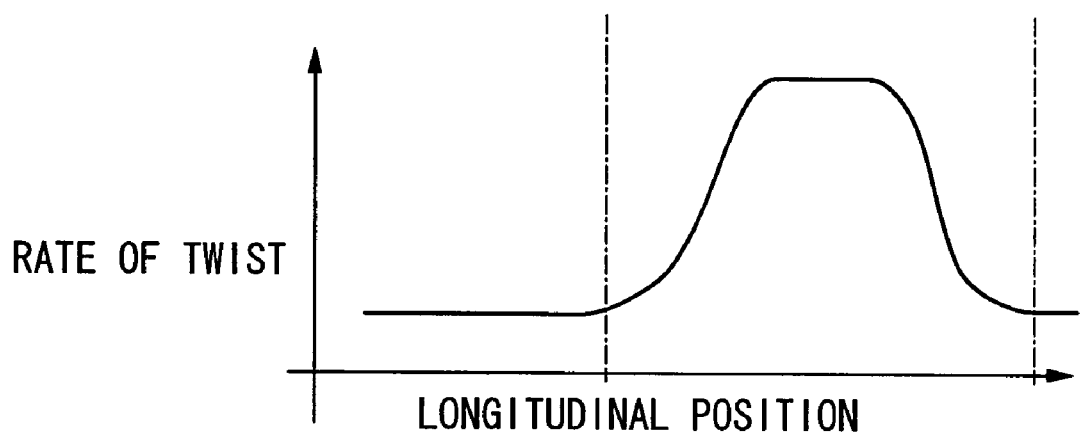
FIG. 3 is a diagram showing another example of change in the rate of twist in the image fiber according to the present invention.

In the present invention, it is important to regulate twisting during the process for applying twisting so that rate of twist in the twisted portion 2 is held constant from the beginning portion of the twisted portion 2 to the end portion thereof, as shown in FIG. 2. Furthermore, as shown in FIG. 3, it is more preferable to make the rate of twist gradually change in the beginning portion of the twisted portion 2 and in the end portion thereof, in order to prevent defects such as dark spots due to bending of the cores of the image fiber 1, which may occur when the rate of twist changes sharply in the beginning portion of the twisted portion 2 and in the end portion thereof.

Figure 6:
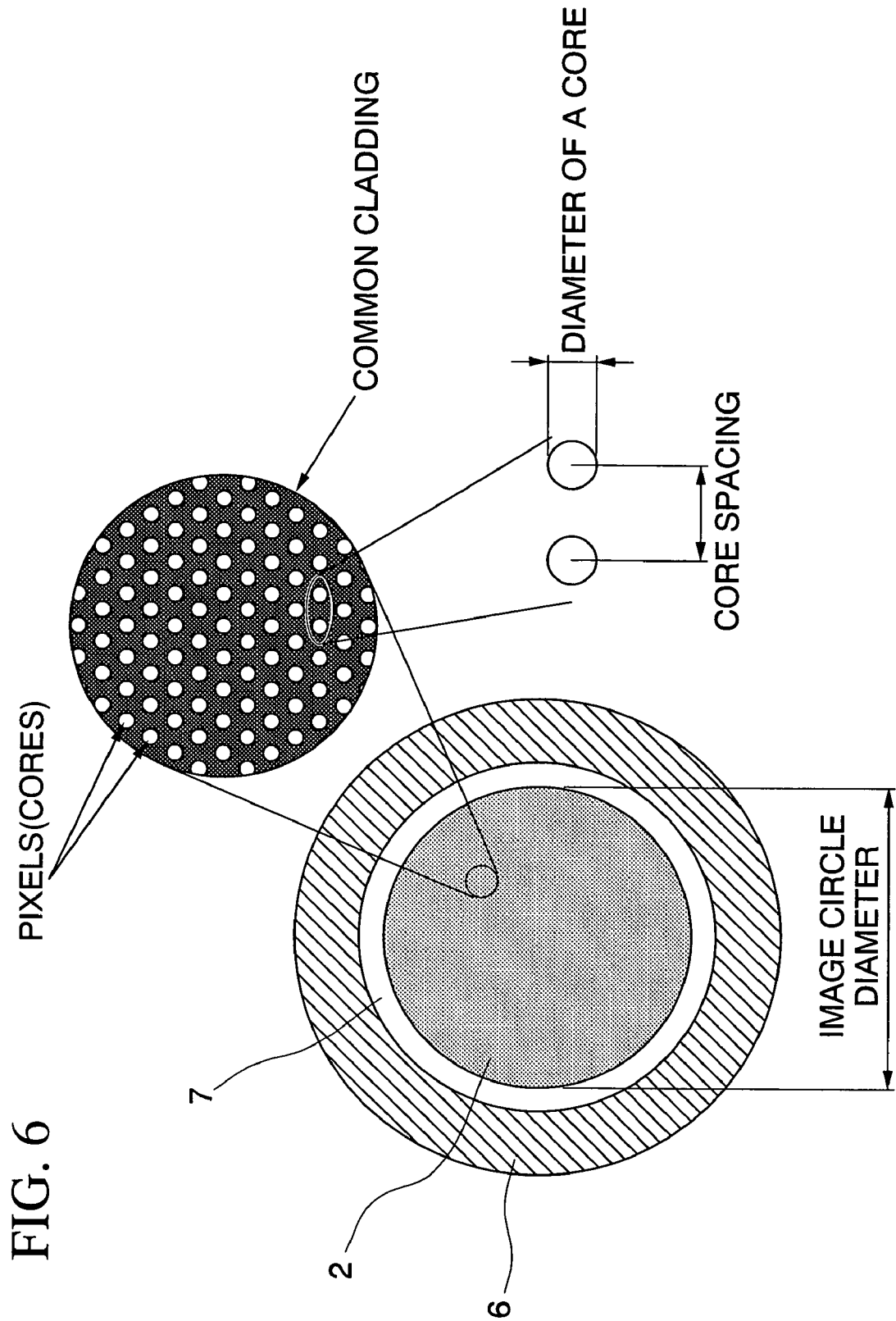
FIG. 6 is a cross-sectional view of an image fiber.

The "rate of twist" in the present invention is defined by rotational angle per millimeter in the twisted portion 2. A preferable range of the rate of twist, which is made to be constant, varies depending on the type of image fiber; however, in general, a range from 1°/mm to 4000°/mm is preferable. A range from 5°/mm to 100°/mm is more preferable. When the rate of twist is less than 1°/mm, it is difficult to handle the image fiber 1 because the twisted portion 2 is too long. When the rate of twist is greater than 4000°/mm, the quality of a transmitted image may be degraded due to excessive deformation and longation of the cores of the image fiber 1. When the rate of twist is set in the above-mentioned range, the amount of transmission light leaking from the cores will be within an allowable range. In the case of an image fiber in which the relative refractive index difference between the cores and cladding is 4%, and D/d is 1.5 (where D is core spacing, and "d" is diameter of a core, see FIG. 6), the elongated lengths of the cores due to twisting may preferably be set to not be more than four times the original lengths.

The overall angle of twist may be preferably selected from 180°, 360°, 540°, and 720°, and the length of the twisted portion 2 is set, in general, in a range from 5 to 25 mm.

Figure 4:
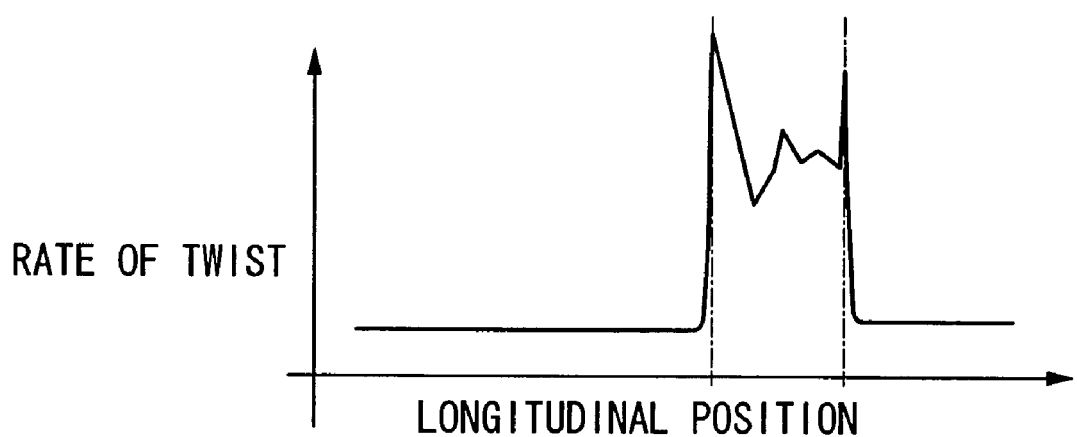
FIG. 4 is a diagram showing an unfavorable example of change in the rate of twist in a twisted portion.

When the rate of twist of the twisted portion 2 locally and steeply changes within the twisted portion 2 as shown in FIG. 4, the quality of a transmitted image may be degraded.

Figure 5:
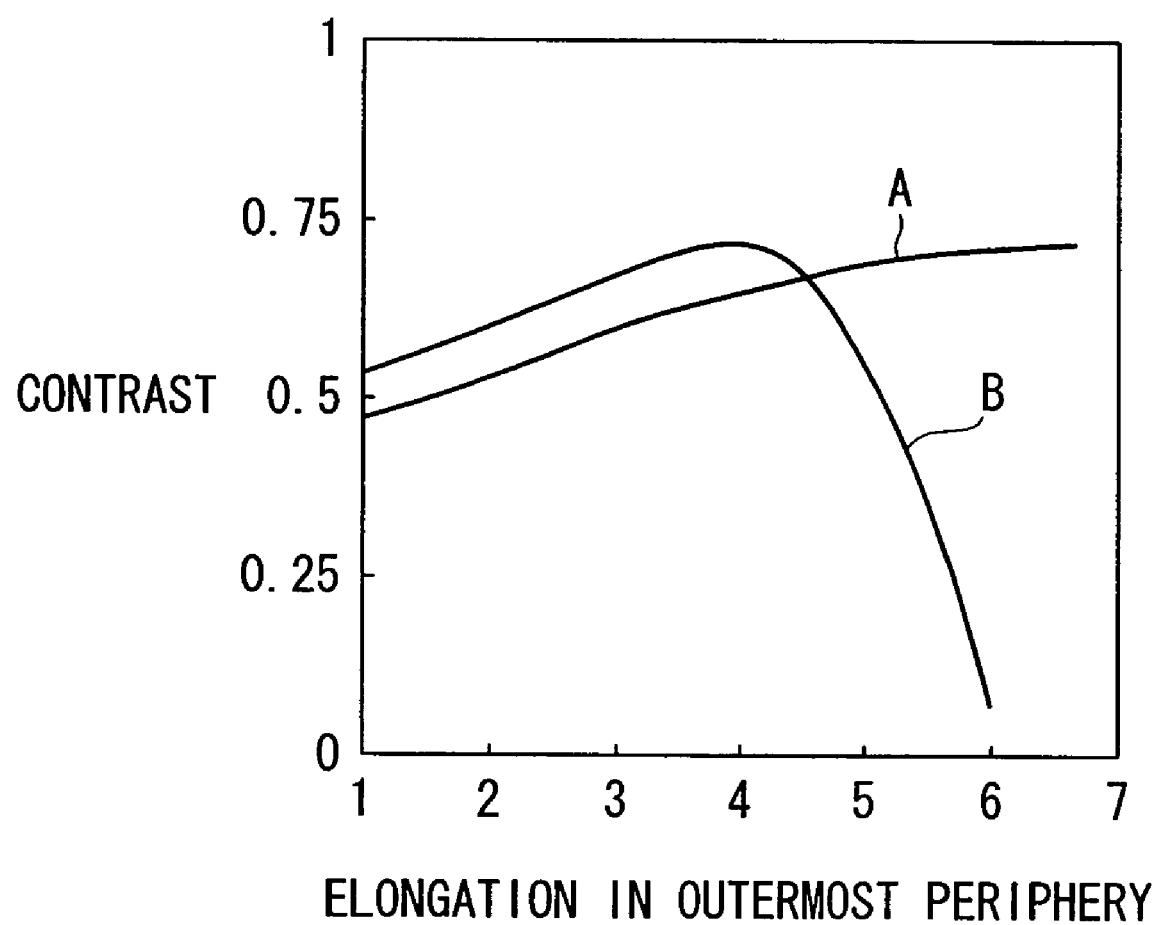
FIG. 5 is a diagram showing a relationship between an amount of twisting and contrast in a transmitted image in an image fiber.

FIG. 5 is a graph showing a relationship between an amount of twisting and contrast in a transmitted image in the image fiber 1. In this graph, curve A indicates change in contrast at the center of the image fiber 1, and curve B indicates change in contrast in the periphery of the image fiber 1. According to this graph, it is clear that contrast in the periphery of the image fiber 1 decreases steeply when the elongated lengths of the cores exceed four times the original lengths. Moreover, it was found that pixel distortion or loss occurs in both the center and the periphery of the image fiber 1 when the elongated lengths of the cores exceed four times the original lengths. Note that contrast in an image is generally defined by $(I_{max}-I_{min})/(I_{max}+I_{min})$, where $I_{max}$ indicates the maximum intensity of a reference image, and $I_{min}$ indicates the minimum intensity of the reference image.

In FIG. 5, the elongation in the outermost periphery, which is plotted along the horizontal axis, indicates the degree of elongation of the cores disposed in the outermost periphery of the image fiber due to the twisting process, and which may be expressed by L'/L, where L represents the original length, and L' represents the length after the twisting process. The ratio L'/L may preferably be set to be less than 2.0 when just rotation of a transmitted image is desired, and the ratio L'/L may preferably be set in a range from 2.5 to 3.5 when improvement in the quality of a transmitted image is desired.

In the image fiber 1 as an example, the twisted portion 2 is covered with a protective element 5 as shown in FIG. 1. In this example, the protective element 5 includes a reinforcing pipe 6 such as a metal pipe, etc., and an adhesive 7 such as silicone resin, epoxy resin, etc., to adhere the reinforcing pipe 6 to the image fiber body 4. The length of the reinforcing pipe 6 is greater than that of the twisted portion 2, and the reinforcing pipe 6 may preferably be disposed to overlap with the protective layer 3 by 1 to 10 mm.

In addition, the inside portions of the ends of the reinforcing pipe 6 may preferably be chamfered, or the ends of the reinforcing pipe 6 may preferably be flared so that the adhesive 7 is preferably provided in the inner portion of the reinforcing pipe 6, and so that the end edges of the reinforcing pipe 6 do not contact the protective layer 3 of the image fiber 1, whereby the protective layer 3 is not damaged by the ends of the reinforcing pipe 6 when a bending force is applied to the image fiber 1.

Furthermore, the reliability of the image fiber 1 may be improved by using a reinforcing pipe 6 having tapering so that the middle portion thereof is thicker (not shown in FIG. 1). Moreover, if silicone resin having considerable resilience is used as the adhesive 7, the difference between the elongations of the reinforcing pipe 6 and the image fiber 1 due to difference in coefficients of thermal expansion, which occur when temperature changes, may be absorbed.

In the image fiber 1, because the twisted portion 2 is formed to have a constant rate of twist, the orientation of a transmitted image can be rotated, and contrast in the transmitted image can be improved. In addition, problems such as pixel distortion or loss due to excessive twist can be avoided.

Moreover, because the twisted portion 2 is protected and reinforced by the protective element 5, it is easy to handle the image fiber 1 while avoiding damage to the twisted portion 2. Furthermore, when the image fiber 1 is used as an image scope, the protective element 5 may be used as an element to which various elements are to be attached.

In general, image fibers as manufactured have a slight twist due to manufacturing processes. Because of this, if the image fiber 1 is twisted in the same direction as that of the original twist so that the angle of twist is reduced when the twisted portion 2 is formed to rotate the orientation of a transmitted image by 180°, risk of pixel distortion or loss may be reduced.

An additional protective layer of the same resin material as the protective layer 3 may be used as the protective element for the twisted portion 2 instead of the reinforcing pipe 6. As in the above case, the additional protective layer may preferably be tapered so that the middle portion thereof is made thicker, and therefore the rigidity of the middle portion is increased. As a result, stress concentration at the ends of the additional protective layer can be avoided, and reliability of the image fiber can be improved.

In the image fiber 1, because the rate of twist is set to be constant in the twisted portion 2, and is set in arrange from 1°/mm to 4000°/mm, the cores, which form pixels, will not significantly deform and elongate. Therefore, defects such as dark spots in the transmitted image due to pixel distortion or loss can be avoided.

Moreover, not only can the orientation of the transmitted image be rotated, but also contrast in the transmitted image can be improved.

When both the rate of twist at the beginning portion of the twisted portion and the rate of twist at the end portion of the twisted portion are set in a range from 3°/mm to 400°/mm, and the rates of twist are made to change gradually in these portions, deformation of the cores, which form pixels, will be further reduced, and defects in the transmitted image can be more reliably prevented.

Figure 7:
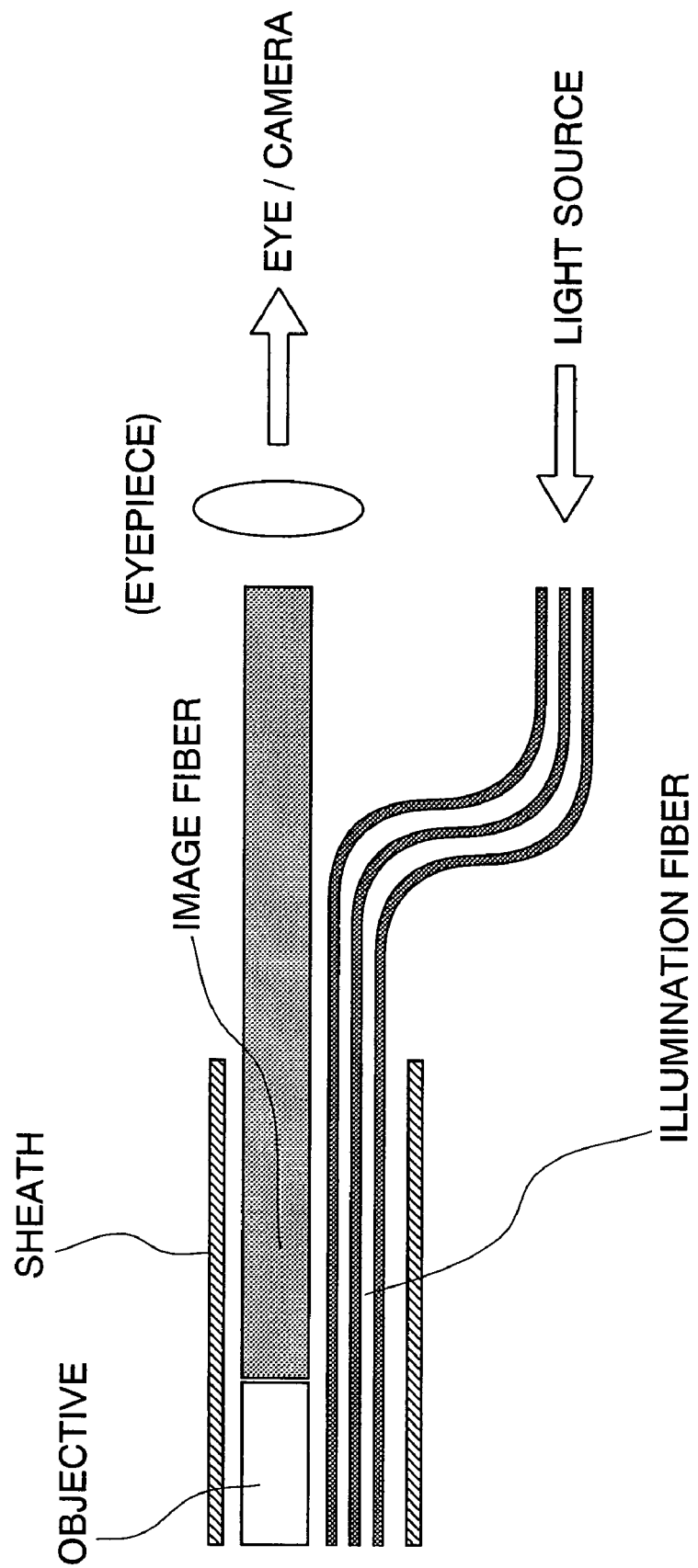
FIG. 7 is a schematic side view showing an example of a fiber scope in which an image fiber according to the present invention is used.

In the case in which the twisted portion 2 is covered by the protective element 5, damage to the twisted portion 2 can be prevented even when an external force is applied to the twisted portion 2; therefore, it is easy to handle the image fiber 1. When the image fiber 1 is used in a fiber scope, the protective element 5 may be used as an element to which various elements are to be attached. FIG. 7 shows an example of a fiber scope in which the image fiber according to the present invention is employed.

Figure 8:
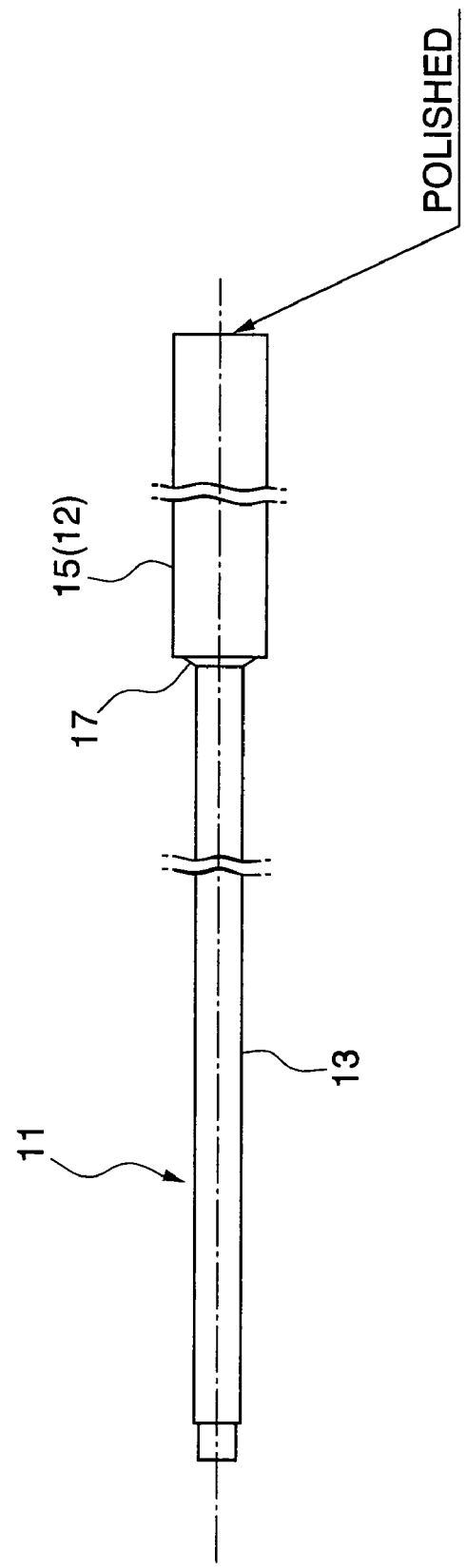
FIG. 8 is a side view showing another embodiment of an image fiber according to the present invention.

FIG. 8 is a side view showing an image fiber 11 as another embodiment of the present invention. The image fiber 11 includes an image fiber body (not indicated), a twisted portion 12, a protective layer 13, a protective element 15, and an adhesive 17. In this embodiment, an end of the twisted portion 12 is polished.

TABLE 1 shows specifications of Examples of image fibers to which the present invention may be applied.

TABLE 1

| Item | Example 1 | Example 2 | Example 3 | Example 4 |
|---|---|---|---|---|
| Number of picture elements (nominal) | 3,000 | 10,000 | 50,000 | 100,000 |
| Image circle diameter (μm) | 190 | 460 | 1,025 | 1,400 |
| Fiber diameter (μm) | 215 | 500 | 1,100 | 1,500 |
| Coating diameter (μm) | 285 | 600 | 1,200 | 1,700 |

As explained above, according to the image fiber of the present invention, the orientation of the transmitted image can be rotated without degrading the quality of the transmitted image.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as being limited by the foregoing description and is only limited by the scope of the appended claims.

What is claimed is:

1. An image fiber comprising:
an image fiber body comprising a plurality of cores and having a twisted portion with a beginning portion, a middle portion and an end portion, wherein
the rate of twist in the middle portion is constant, the rate of twist gradually increases in the beginning portion and the rate of twist gradually decreases in the end portion; and
the plurality of cores are twisted in only one direction.

2. An image fiber according to claim 1, wherein the rate of twist in the middle portion is set in a range from 1 °/mm to 1000°/mm.

3. An image fiber according to claim 1, wherein the rate of twist in the middle portion is set in a range from 5°/mm to 100°/mm.

4. An image fiber according to claim 1, wherein the rate of twist in the beginning portion and the rate of twist in the end portion vary in a range from 3°/mm to 400°/mm.

5. An image fiber according to claim 1, further comprising a protective element covering the twisted portion.

6. An image fiber according to claim 5, wherein the protective element comprises a reinforcing pipe and an adhesive that adheres the reinforcing pipe to the image fiber body.

7. An image fiber according to claim 6, wherein the length of the reinforcing pipe is greater than the length of the twisted portion.

8. An image fiber according to claim 6, wherein the reinforcing pipe overlaps an image fiber protective layer.

9. An image fiber according to claim 8, wherein the reinforcing pipe overlaps the image fiber protective layer by 1 to 10 mm.

10. An image fiber comprising:
an image fiber body comprising a plurality of cores and having a protective element covering a twisted portion with a beginning portion, a middle portion and an end portion,
wherein the rate of twist in the middle portion is constant, the rate of twist gradually increases in the beginning portion and the rate of twist gradually decreases in the end portion,
wherein the protective element comprises a reinforcing pipe and an adhesive that adheres the reinforcing pipe to the image fiber body, and
wherein inside portions of the reinforcing pipe are chamfered.

11. An image fiber comprising:
an image fiber body comprising a plurality of cores and having a protective element covering a twisted portion with a beginning portion, a middle portion and an end portion,
wherein the rate of twist in the middle portion is constant, the rate of twist gradually increases in the beginning portion and the rate of twist gradually decreases in the end portion,
wherein the protective element comprises a reinforcing pipe and an adhesive that adheres the reinforcing pipe to the image fiber body, and
wherein ends of the reinforcing pipe are flared.

12. An image fiber comprising:
an image fiber body comprising a plurality of cores and having a protective element covering a twisted portion with a beginning portion, a middle portion and an end portion,
wherein the rate of twist in the middle portion is constant, the rate of twist gradually increases in the beginning portion and the rate of twist gradually decreases in the end portion,
wherein the protective element comprises a reinforcing pipe and an adhesive that adheres the reinforcing pipe to the image fiber body, and
wherein a middle portion of the reinforcing pipe is tapered.

13. An image fiber comprising:
an image fiber body comprising a plurality of cores and having a protective element covering a twisted portion with a beginning portion, a middle portion and an end portion,
wherein the rate of twist in the middle portion is constant, the rate of twist gradually increases in the beginning portion and the rate of twist gradually decreases in the end portion,
wherein the protective element comprises a reinforcing pipe and an adhesive that adheres the reinforcing pipe to the image fiber body, and
wherein an end of the twisted portion is polished.

14. An image fiber according to claim 1, wherein the rate of twist in the twisted portion is set so that the elongated lengths of the cores due to twisting do not exceed four times the original lengths thereof.

* * * * *